United States Patent [19]

Keller et al.

[11] Patent Number: 5,795,636
[45] Date of Patent: Aug. 18, 1998

[54] POSITIONABLE AND REPOSITIONABLE ADHESIVE ARTICLE

[75] Inventors: Janet T. Keller, Eagan; Kenneth D. Wilson; Clyde D. Calhoun, both of Stillwater; Larry A. Meixner, Woodbury, all of Minn.

[73] Assignee: Minnesota Mining and Manufacturing Company, St. Paul, Minn.

[21] Appl. No.: 559,037

[22] Filed: Nov. 15, 1995

[51] Int. Cl.$^6$ ..................................... B32B 7/12
[52] U.S. Cl. .................. 428/40.1; 428/119; 428/202; 428/343; 428/355 RA
[58] Field of Search ................... 428/40, 119, 161, 428/202, 343, 352, 355, 354, 355 RA

[56] References Cited

U.S. PATENT DOCUMENTS

| | | | |
|---|---|---|---|
| 3,301,741 | 1/1967 | Henrickson et al. | 161/119 |
| 3,314,838 | 4/1967 | Erwin | 156/71 |
| 3,331,279 | 7/1967 | Aldrin et al. | 89/1.802 |
| 3,554,835 | 1/1971 | Morgan | 156/234 |
| 3,691,140 | 9/1972 | Silver | 260/78.5 |
| 4,023,570 | 5/1977 | Chinal et al. | 128/290 |
| 4,054,697 | 10/1977 | Reed et al. | 428/40 |
| 4,151,319 | 4/1979 | Sackoff et al. | 428/40 |
| 4,166,152 | 8/1979 | Baker et al. | 428/522 |
| 4,376,151 | 3/1983 | Parrotta | 428/323 |
| 4,418,120 | 11/1983 | Kealy et al. | 428/343 |
| 4,556,595 | 12/1985 | Ochi | 428/143 |
| 4,735,837 | 4/1988 | Miyasaka et al. | 428/40 |
| 5,008,139 | 4/1991 | Ochi et al. | 428/514 |
| 5,141,790 | 8/1992 | Calhoun et al. | 428/40 |
| 5,196,246 | 3/1993 | Kauss et al. | 428/39 |
| 5,296,277 | 3/1994 | Wilson et al. | |
| 5,300,340 | 4/1994 | Calhoun et al. | 428/343 X |
| 5,346,766 | 9/1994 | Otter et al. | 428/355 |
| 5,487,929 | 1/1996 | Rusincovitch, Jr. et al. | 428/355 X |

FOREIGN PATENT DOCUMENTS

| | | |
|---|---|---|
| 1 541 511 | 2/1979 | European Pat. Off. |
| 0 279 579 A1 | 4/1993 | European Pat. Off. |
| WO 91/06424 | 5/1991 | WIPO |
| WO 92/13924 | 8/1992 | WIPO |

OTHER PUBLICATIONS

*Hawley's Condensed Chemical Dictionary*, 11th ed., Van Norstrand Reinhold, New York, p. 23 (1987) *Principals of Polymerization*, 3rd ed., Ch. 3, john Wiley and Sons, Yew York (1991).

*Primary Examiner*—Daniel Zirker
*Attorney, Agent, or Firm*—Carolyn V. Peters

[57] ABSTRACT

An adhesive sheet having an adhesive layer and at least one surface being topologically microstructured, either with configured structures or a coating of particles and an underlying adhesive such that the adhesive layer has at least two levels of adhesion, a contact bond and an application bond, such that initial contact bond is substantially less than the application bond and that the contact bond simultaneously changes to the application bond with the application of pressure onto the adhesive sheet.

16 Claims, 1 Drawing Sheet

POSITIONABLE AND REPOSITIONABLE ADHESIVE ARTICLE

TECHNICAL FIELD

This invention relates to adhesive articles with positionable and/or repositionable bonding properties and more particularly to adhesive articles that retain positionable and repositionable bonding properties after repeated application and removal of the article.

BACKGROUND OF THE INVENTION

Pressure sensitive adhesive (PSA) sheets, films and tapes are often difficult to apply to a substrate in a precise location and without air entrapment, primarily due to premature adhesion (that is, adhesion prior to when wanted or expected) or "quick stick" behavior of the PSA. This is particularly evident with "aggressive" PSA's that have high bond strengths and/or low temperature tack properties. Dimensionally large pressure sensitive adhesive coated sheets can also be difficult to apply because of the large dimensions, even when the PSA used on the sheet is "removable".

Although several methods and configurations have been developed to make application of PSA films and tapes easier, no art to date provides for adhesive articles capable of forming strong permanent bonds that have a combination of low-stick positioning, rapid or instantaneous bonding when pressed in place and retention of the low-stick positioning if and when the sheet is removed after it has been pressed in place. At least one reference to date (U.S. Pat. No. 4,054,697) has provided for a combination of non-stick positioning, rapid or instantaneous bonding when pressed in place and retention of non-stick positioning if and when the sheet is removed after it has been pressed into place. However, U.S. Pat. No. 4,054,697 points out that with resilient particles, a sufficiently strong bond must be formed to the support surface to "prevent the deformed particles from recovering to their undeformed dimensions," which "would cause the sheet material to come away from the support surface" (col. 2, lines 26–30). U.S. Pat. No. 4,054, 697 further points that "it may be desireable for the pressure sensistive adhesive to be curable after the sheet material has been adhered" to "overcome any tendency of the deformed particles to recover" (col. 2, lines 31–35).

Frequently, application aids such as detergent and water have been used to eliminate preadhesion. Formulations vary, but typically include water, a surfactant or lubricant, and a solvent (generally an alcohol) that speeds bond formation and drying. The liquids tend to form a film between the adhesive and substrate, thus preventing contact and preadhesion. Unfortunately, the liquid is difficult to remove and is seldom completely removed. Additionally, most application aids affect the adhesive properties and prevent rapid formation of a strong bond between adhesive and substrate. The application aids may also mar or stain substrate surfaces.

Dry application aids, such as particles, powders or talcs have also proven useful in preventing preadhesion (See, e.g., U.S. Pat. Nos. 4,376,151 and 4,556,595). These techniques make application easy and provided for easy positioning and repositioning. Unfortunately, these techniques also require contact of 1 to 7 days to form a strong adhesive bond to the substrate.

Alternatively, discontinuous coatings of nontacky materials that project from relatively planar adhesive surface have also been used to prevent preadhesion of a PSA layer during application. These adhesive films and tapes have no adhesion when placed lightly against the substrate surface. Although these articles can be placed against a substrate and freely moved over the substrate surface, the articles lack any means for weakly and temporarily bonding the adhesive layer to a substrate prior to permanently bonding this article to the substrate. Such coatings include patterned polymer coatings, particles, and films (See, e.g., U.S. Pat. Nos. 3,554,835; 4,023,570; 4,054,697; 4,151,319; 5,008,139; and U.K. Patent No. 1,541,311).

For example, CONTROLTAC™ brand adhesives use a random distribution of hollow glass microspheres partially embedded in an adhesive layer as a means to prevent contact and preadhesion (See U.S. Pat. No. 3,331,279). EGTac™ brand adhesive films use similar "non-fragile," hollow glass microspheres partially embedded in the adhesive surface (See U.S. Pat. No. 5,008,139). Hi-S-Cal™ brand film with a "pressure-activated adhesive" that similarly used solid glass microspheres partially embedded in an adhesive surface as a means to prevent contact and preadhesion. In each case, application pressure to the sheet crushes and or embeds the microspheres into the adhesive layer permitting the bulk of the adhesive to contact the substrate and to instantly form a strong bond.

Alternatively, U.S. Pat. No. 3,314,838 describes a similar configuration wherein the tops of the hollow microspheres protruding from the adhesive layer surface are coated by a thin layer of PSA. Pressure application crushes the microspheres permitting the bulk of the adhesive layer to contact the substrate and to instantly form a strong bond.

Other methods for handling preadhesion include formation of brittle plastic projections on a PSA surface (See U.S. Pat. No. 3,301,741), or formation of small discrete clusters of particles protruding from the adhesive surface (See U.S. Pat. No. 5,141,790). For example in U.S. Pat. No. 5,141,790, the particles were tacky adhesive microspheres that provided weak bonding to a substrate when applied using light application pressure and strong bonding when applied using higher application pressures. However, this multi-adhesive construction tends to be more difficult to construct and adhesive particle transfer can be a problem.

Microsphere and patterned adhesives exhibiting repositionable properties have also been reported (See U.S. Pat. Nos. 3,691,140 and 4,166,152). Deformable microspheres, as described in U.S. Pat. No. 4,735,837 impart a rough or pebble-like surface and repositionable bond. In all these cases, the adhesive films readily form weak, repositionable bonds to a substrate, but do not form a strong, permanent bond.

Topologically structured adhesive have also been described. For example, relatively large scale embossing of an adhesive has been described to permanently reduce the PSA/substrate contact area and hence the bonding strength of the PSA (See EPO 0 279 579). Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive sheet having a microstructured adhesive surface comprising a uniform distribution of adhesive or composite adhesive "pegs" over the functional portion of an adhesive surface and protruding outwardly from the adhesive surface provide a sheet that is both positionable and repositionable when it is laid on a substrate surface (See U.S. Pat. No. 5,296,277). Pressing the adhesive sheet results in an instant formation of a strong bond between the adhesive sheet and the substrate. Such an adhesive also required a relatively expensive coincident microstructured release liner to protect the adhesive pegs during storage and processing.

A positionable-repositionable pressure sensitive adhesive is described in WO 91/06424. This adhesive contains a mixture of adhesive resin, detackifing resin, detackifying particles and tackifying resin. Sheet articles having a layer of this adhesive exhibit low tack, for easy positioning, and a low initial bond when pressed in place, for easy repositioning. Adhesive films having this kind of adhesive exhibit the ability to slide over a surface on contact, and bond with modest strength when pressed in place. The adhesive coated films slide freely when removed and recontacted to the surface. However, this adhesive shows only slow adhesion build. This slow adhesion build can increase installation time, such as when a large graphic is applied to a truck siding, the adhesion must be sufficient to allow the operation of the vehicle at normal operating speeds. Furthermore, the adhesive film sticks over a very limited application temperature range.

In view of the foregoing discussed disadvantages and limitation that exist with presently known adhesives and configurations, improvements are continuously desired and sought by those within the industry. It was against this background that an improved adhesive layer microstructure having continued positionability and repositionability after repeated application and removal was sought.

SUMMARY OF THE INVENTION

In one aspect of the present invention, an adhesive sheet is provided comprising an adhesive layer that (1) has microstructural surface features that impart positionable and repositionable behavior to the adhesive sheet, and (2) is sufficiently elastic to permit these microstructural surface features to rapidly recover the major portion of their size and shape when the applied article is removed from a substrate, backing, or release liner surface. The elastic behavior of the adhesive is defined as the retained lap shear relaxation stress expressed as $$\%LSS=100\%\times[(stress_{t=120})/(stress_{t=0})].$$

Characteristically, the adhesive sheet has an adhesive layer and at least one surface being topologically microstructured, either with configured structures or a coating of particles and an underlying adhesive such that the adhesive layer has at least two levels of adhesion, a contact bond and an application bond, such that initial contact bond is substantially less than the application bond and that the contact bond simultaneously changes to the application bond with the application of pressure onto the adhesive sheet.

The adhesive articles of this invention have an adhesive layer that is sufficiently elastic to display a "retained lap shear relaxation stress" exceeding 55% and most preferably exceeding 70%.

The adhesive articles of this invention also have at least one adhesive surface with topologically microstructured surface (also referred to as "adhesive surface features") such as projecting adhesive "pegs" or "posts", discrete, partially embedded, particles or discrete projecting clusters of particles. These various projections such as microstructured pegs, may have adhesive tops or nonadhesive tops (provided by means of a nonadhesive cap, for example), may be a series of projections that are covered with particles that may or may not be adhesive, a discontinuous coating of particles, such as non-tacky microspheres.

The combination of surface features on an elastic adhesive surface provides the invention with a unique combination of properties: an adhesive article or tape that may be easily positioned on a substrate surface, optionally, it may be weakly and temporally bonded to the substrate and repositioned as desired, then instantly attached to the surface of the substrate with a stronger bond by applying firm pressure. Advantageously, the invention provides an adhesive article or tape that may be removed after application, all the while retaining ease of positioning and/or repositioning and then may be rapidly, more permanently reattached.

While conventional adhesive articles provide the user the ability to slide the articles over a surface or weakly attach to the surface, the first time they are applied to a substrate surface, the articles quickly lose the ability to be slid over a substrate surface or to weakly attached to the substrate surface, once they have been pressed firmly against a substrate surface and removed. Advantageously, recoverability of these desirable features permit easy positionability and repositionability.

Other conventional adhesive articles may be easily positioned or repositioned on a substrate surface, then bonded, and when removed, these adhesive articles remain easy to position or reposition. However, these articles do not rapidly form a strong adhesive bond to the substrate, a deficiency resolved by the present invention.

The present invention is an adhesive sheet comprising a backing, an elastic adhesive layer coated onto at least a portion of one major surface of the backing, and at least one surface of the adhesive layer subsumes microstructural surface features. Adhesive layers useful in this invention may be continuous films, discontinuous patterns, droplets, or microspheres, or combinations or blends. Furthermore, it is permissible to have one or more adhesives. The adhesive may be any of those well know in the art and may contain tackifying resins, plasticizers, fillers colorants and other additives known to those skilled in the art.

Surface features found useful for the present invention include but are not limited to the discrete adhesive and composite "pegs" described by U.S. Pat. No. 5,296,277, the projecting clusters of particles described by U.S. Pat. No. 5,141,790. Projecting particles and other projections described in the art behave similarly when used in combination with the adhesive films of the present invention.

In another aspect of the present invention, the adhesive sheet may be fabricated on a release liner or a reusable belt having a microstructured surface, such as an embossed liner or an embossed reusable belt then transferred to a non-microstructured, that is, smooth release liner or wound up on itself into a tape roll, wherein the backing is a smooth backing and there is a low adhesion backsize coated thereon the side opposite the adhesive layer.

In yet another aspect of the present invention, several adhesive sheets having, for example, different colored backings may be cut or slit into graphic designs, alphanumeric characters, or stripes and these removed from one release liner or backing and in combination applied to a new release liner or backing.

In this application:

"adhesion" refers to the state in which two surfaces are held together by interfacial forces, which may consist of valence forces or interlocking action, or both (Hawley's Condensed Chemical Dictionary, 11th ed. Van Nostrand Reinhold, New York, 1987, page 23);

"adhesive" refers to the adhesive composition, and may also refer to the adhesive layer of an adhesive article;

"bead" refers to particles that may be spherical, cubic, irregularly shaped, solid, porous, hollow, elastic, inelastic, adhesive or nonadhesive;

"elastic" refers to the ability of a material to recover its original shape partially or completely after the deforming force has been removed, wherein the amount of deformation that is not recovered is called permanent set or permanent elongation;

"film" means a thin, flexible sheeting, typically plastic and is also referred to as a backing or carrier web;

"pegs" when used alone encompasses adhesive pegs and composite pegs;

"positionable" means an adhesive or pressure sensitive adhesive that can be placed against a substrate surface and easily slid over the surface into proper position without preadhering or sticking the adhesive article; pressure is generally required to adhere the adhesive article to the substrate;

"recoverable" means that properties, such as, slideability or two levels of adhesion, reappear when the tape is removed cleanly from a surface to which it has been forced in contact with by high application pressure;

"removable" means an adhesive or pressure sensitive adhesive in which the adhesive and film can be simultaneously removed from a substrate without ply failure, "two-bond" failure, adhesive transfer, or film disintegration;

"repositionable" means an adhesive or pressure sensitive adhesive is one that can be applied and adhered to a substrate and then removed and reapplied without distorting, defacing, or destroying the film, adhesive, or substrate;

repositionable adhesives need not be positionable or vise versa;

"sheet" means broad adhesive sheets as well as narrow adhesive strips and also other configurations such as alphanumeric characters that can be individually repositionable or, when releasably supported by a carrier in a desired pattern, collectively repositionable, furthermore the adhesive articles can be marketed in long rolls or in individual sheets;

"substantially uniformly distributed" means the unit average density of pegs on the functional portion of the adhesive surface is uniform over the whole adhesive surface in a regular pattern or random array as is necessary to make that layer positionable and/or repositionable;

"substrate" means the surface upon which an adhesive article is applied; and

"tack" means instant contact adhesion between the adhesive and the substrate, and the tack may be substrate specific, that is, no thumb tack. "retained lap shear relaxation stress" (LSS) is a measure of the elastic behavior of how fast and how much an adhesive "cold flows" under a shear stress, as described in the test method.

BRIEF DESCRIPTION OF THE DRAWING

In the drawing, each figure of which is schematic.

DESCRIPTION OF THE PREFERRED EMBODIMENT(S)

A pressure sensitive adhesive (PSA) coated article, including tapes and transfer tapes is provided comprising an adhesive layer coated onto at least one major surface of a suitable backing, such that the PSA-coated article has recoverable positionability or recoverable two levels of adhesion—the first level being repositionable from high energy surfaces independent of time—wherein the positionability or two levels of adhesion is derived from pegs protruding from the adhesive wherein the pegs are predetermined in size, spacing, and shape. The pegs may be adhesive, particle-filled adhesive or nonadhesive. The recoverable aspect of the adhesive layer is derived from the elastic behavior of either the adhesive or the combination of the adhesive and the pegs.

Improvements provided by the adhesives of the present invention include: (1) the positionability and repositionability are achieved with the use of pegs predetermined in size, spacing and shape without either the expense of an embossed release liner or the loss in esthetics associated with an embossed carrier web, and/or (2) the positionability and repositionability are recoverable wherein the repositionability is recoverable from the second of two levels of adhesion (repositionable products such as "Post-It" brand notes have one level of adhesion).

The functional aspects of the positionable and repositionable tapes of this invention are that as the tape or transfer tape is unwound, pegs or protrusions of predetermined size, shape and spacing appear almost instantaneously on the surface of the adhesive. These protrusions make the tape positionable or repositionable. A positionable tape is herein defined as a PSA tape that can be moved relative to a substrate while the adhesive side of said tape is in contact with said substrate, as long as a predetermined threshold application pressure is not exceeded.

The carrier webs for the transfer tapes of this invention can be either embossed or unembossed as long as the positionability and repositionability are recoverable. The transfer tapes of this invention can have one or two sides positionable and/or repositionable.

Figure 1:
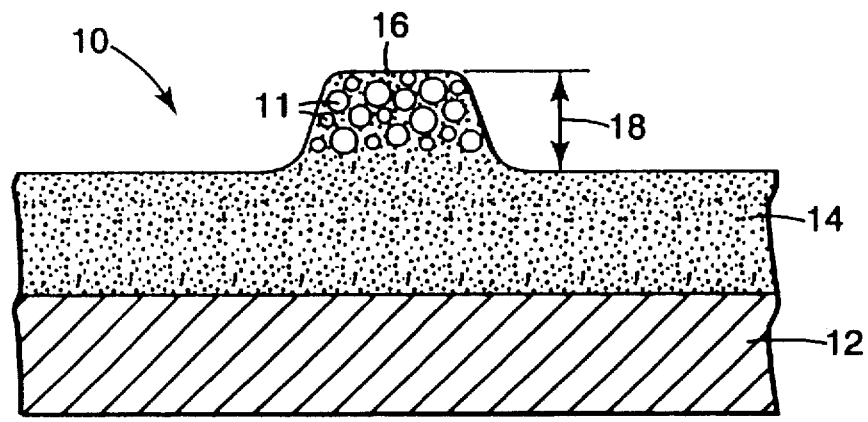
FIG. 1 is a planar cross section schematic of an uncompressed or fully recovered adhesive surface.

Characteristically and referring to FIG. 1, the adhesive sheet (10) has a backing (12) and an adhesive layer (14) coated thereon and at least one surface being topologically microstructured, either with configured structures (16) or a coating of particles (not shown) and an underlying adhesive such that the adhesive layer (14) has at least two levels of adhesion, a contact bond and an application bond, such that initial contact bond is substantially less than the application bond and that the contact bond simultaneously changes to the application bond with the application of pressure onto the adhesive sheet. Alternatively, the adhesive sheet (10) may be configured in such a way as to have two topologically microstructured surfaces, with or without a backing (12).

Referring still to FIG. 1, the adhesive articles of this invention also have at least one adhesive surface with topologically microstructured surface (also referred to as "adhesive surface features") such as projecting adhesive "pegs" or "posts", discrete, partially embedded, particles or discrete projecting clusters of particles. These various projections such as microstructured pegs (16) may have adhesive tops or nonadhesive tops (provided by means of a nonadhesive cap, for example), may or may not contain particles (11), may be a series of projections that are covered with particles that may or may not be adhesive, a discontinuous coating of particles, such as non-tacky microspheres.

The combination of surface features on an elastic adhesive surface provides the invention with a unique combination of properties: an adhesive article or tape that may be easily positioned on a substrate surface, optionally, it may be weakly and temporarily bonded to the substrate and repositioned as desired, then instantly attached to the surface of the substrate with a stronger bond by applying firm pressure. Advantageously, the invention provides an adhesive article or tape that may be removed after application, all the while retaining ease of positioning and/or repositioning and then may be rapidly, more permanently reattached.

Adhesive characteristics—The viscoelastic properties of the adhesive provide the functionality of the adhesive layer. Elastic adhesives found useful in the present invention all display a measured "retained lap shear relaxation stress" that exceeds about 55%, and preferably 70%. Adhesives having a measured "retained lap shear relaxation stress" greater than about 70% were observed to be "instantly" (within 60 seconds) positionable when removed from a substrate, backing or release liner and laid against the substrate again.

Figure 2:
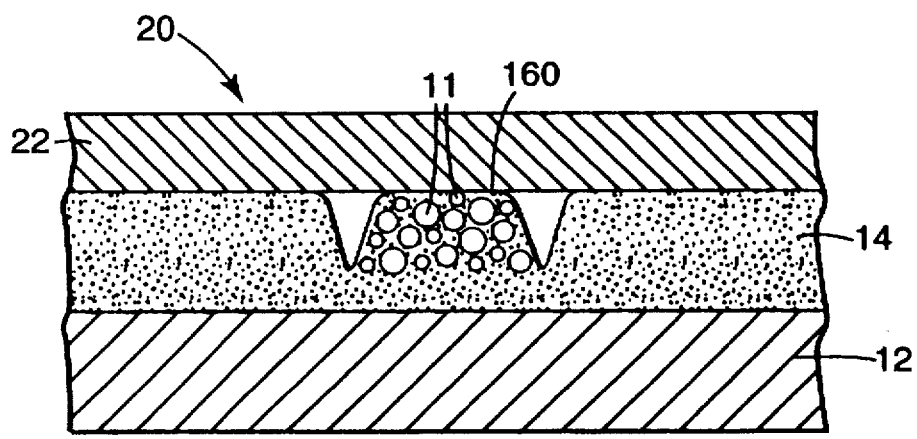
FIG. 2 is a planar cross section schematic of a fully compressed adhesive surface.
Figure 3:
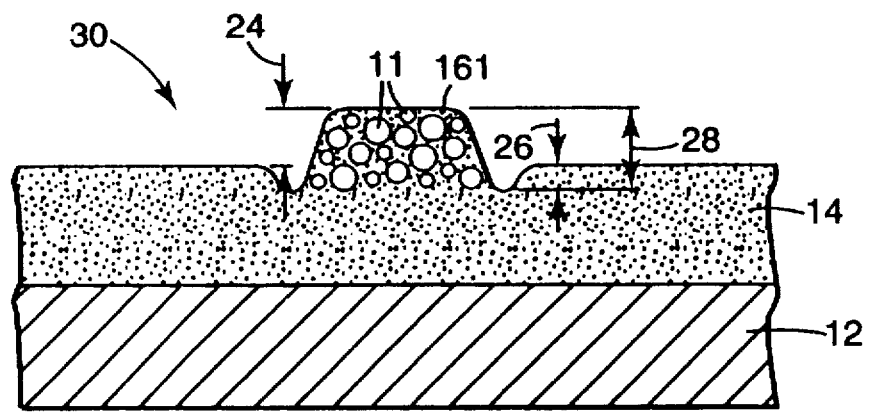
FIG. 3 is a planar cross section schematic of a partially recovered adhesive surface.

Referring to FIGS. 2 and 3, adhesives having a measured "retained lap shear relaxation stress" between about 55% and 70% show the same positionable behavior after they are removed from a substrate, backing or release liner (12), but only after a recovery period of at least several minutes. Adhesives having a measured "retained lap shear relaxation stress" below about 55% do not show positionable behavior once pressed against and removed from a substrate, backing or release liner.

Over long recovery times, these adhesives can show partial recovery of the compressed microstructure, and may show sufficient recovery of structure to exhibit positionable behavior. However, the recovery times may be too long (>30 minutes) to be practical or commercially useful.

Referring again to FIGS. 2 and 3, a particularly unique property of the adhesive sheets (10) of the present invention, is the ability of the adhesive to be elastic enough to permit the microstructures or other surface features (16) having to be compressed into the adhesive layer (14), while maintaining the general shape and size or height (18) of the microstructure or feature. This allows a microstructured adhesive sheet (20) to be overlaid with a release liner (22) or rolled back on itself (such as in a roll of tape configuration), such that the microstructure or feature (160) is protected during the period between manufacture and application.

The recovery or elastic property of the adhesive that is particularly important to this invention is the percent shear stress retained by the adhesive when sheared and held at a constant displacement. This is particularly evident when for example, the release liner (22) is removed or the adhesive article (30) is unrolled, the microstructures or features (161) recover either completely to the full extent with would be reflected by the original height (28) or to at least a partial height (24), such that the difference between the partial height (24) and the "nonrecovered" height (26) is sufficient to permit the adhesive article to exhibit at least two levels of adhesion. This recovery property may be easily measured using a modification of the lap shear tests PSTC7 and ASTM D3654.

The adhesive articles of this invention have an adhesive layer that is sufficiently elastic to display a "retained lap shear relaxation stress" exceeding 55% and most preferably 70%.

Adhesive layers useful in this invention may be continuous films, discontinuous patterns, droplets, or microspheres, or combinations or blends thereof. The adhesive may be any of those well know in the art and may contain tackifying resins, plasticizers, fillers colorants and other additives known to those skilled in the art.

In addition to the adhesive layer, the adhesive layer has a topologically microstructured surface (also referred to as "adhesive surface features") such as projecting adhesive "pegs" or "posts", discrete and/or partially embedded particles or discrete projecting clusters of particles. These various projections such as microstructured pegs, may have adhesive tops or nonadhesive tops (provided by means of a nonadhesive cap, for example), may be a series of projections that are covered with particles that may or may not be adhesive, a discontinuous coating of particles, such as non-tacky microspheres. Typically the surface features have heights in the range of 4 μm to 200 μm and/or diameters in the same range.

Surface features found useful for the present invention include but are not limited to the discrete adhesive and composite "pegs" described by U.S. Pat. No. 5,296,277, the projecting clusters of particles described by U.S. Pat. No. 5,141,790. Projecting particles and other projections described in the art behave similarly when used in combination with the adhesive films of the present invention.

Ideally, an adhesive coated-sheet has an adhesive that does not bond or very weakly bonds to a surface on contact ("contact bond"), to permit easy placement of the sheet, bonds ("application bond") with the appropriate strength immediately when pressed in place, that is the contact bond changes simultaneously to an application bond when pressure is applied to the adhesive coated-sheet. In some instances, the adhesive sheet may be removeable for relocation and behaves like the virgin sheet in application. In other words, the adhesive layer has at least two levels of adhesion, a contact bond and an application bond, such that initial contact bond is substantially less than the application bond and that the contact bond simultaneously changes to the application bond with the application of pressure onto the adhesive sheet. When a microstructured adhesive is formulated to have sufficient elasticity, the adhesive surface can recover, forcing the adhesive surface features to "reappear" (that is, the features again protrude above the adhesive surface ) within a short time frame. This allows the properties derived from the microstructure (adhesive surface features) to be reused. Many cycles of application, removal, reapplication are possible without significant degradation in any of the article's properties. Sufficient elasticity can be formulated into an adhesive without impairing its adhesive properties. Lap shear stress relaxation, a simple test method, can determine the suitability of an adhesive for this invention. Several classes of adhesives are usable within the scope of the present invention.

The bond strength of the adhesive must be sufficient to overcome the elastic forces when the background area of the adhesive is pressed onto a substrate. This bond may be reversible or irreversible depending on the nature of the adhesive and substrate, (for example, the microstructure can recover when a tape is unrolled from low adhesion backside, but form a bond strong enough to damage the tape or substrate during removal of a tape that has formed a bond with a substrate).

The objects, features and advantages of the present invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

EXAMPLES

The resins used to prepare the Adhesive Solutions 1–9 contained acrylic copolymers that were prepared by free radical polymerization of acrylic esters and acrylic acid according to free radical polymerization techniques known to those skilled in the art, such as described in Odian, Principals of Polymerization, 3rd ed. John Wiley and Sons, New York, 1991. In the following examples all parts are given by weight. Each of the Adhesive Solutions 1-9 were coated within 4 hours of final preparation.

Scotchcal brand Plus, numbers 3650-10 and 3470, Scotchcal brand, numbers 3650, 3680, 7725 and 7755, Controltac brand Plus, numbers 180-10, 181-10 and 160-30, and Controltac brand, number 180-10 films are from 3M Company, Inc., St. Paul, Minn. "Melinex" film refers to MELINEX brand film, number 475/200, from ICI Americas, Inc., Wilmington, Del.

The adhesives and adhesive articles of this invention show two distinctly different levels of bonding to a surface that are dependent on application method and pressure rather than adhesive build over time. The two discrete kinds of adhesion that may occur between a sample and a substrate surface are: "contact bond" that occurs when the sample adhesive touches or is laid against a substrate without being pressed in place; and "completely applied adhesion" (also referred to as the "application bond") that occurs when the sample is intentionally pressed against a substrate to force a large percent of the adhesive to wet out the substrate surface.

Further, the adhesives and adhesive articles of this invention show two distinctly different levels of adhesion due to the presence of protruding surface features that reappear after having been compressed into the adhesive. The test data below provide a comparison of this recoverable, dual bonding behavior.

The rating data for ease of sliding, positioning and repositioning provided a comparison of the contact adhesion and the ease of positioning or repositioning of samples at the temperatures cited. "Determination of the Minimum Force Needed to form a Fully Applied Adhesive Bond after Removal of an Adhesive from an Embossed Release Liner" and "Determination of the Minimum Force Needed to form a Fully Applied Adhesive Bond after Removal of an Adhesive from a Relaminated Release Liner" test data provided a comparative measure of how much force was needed to obtain a "fully applied adhesive bond" after a sample was placed in contact with a substrate surface.

The adhesive articles of this invention display distinctly different "on contact" versus "fully applied" bonding behavior. The "Feature Rebound" test data are observations of how quickly and completely features, for example, pegs, posts, or particles compressed into an adhesive (latent microstructure) were rebounded by the adhesive. The detailed procedures for the "Peel Adhesion Testing" and the "Testing and Rating Ease of Sliding and Repositioning" are described in column 11, lines 33 to 59 and column 11 line 61 through column 12 line 9 respectively in U.S. Pat. No. 5,296,277 and such description is incorporated herein by reference.

Resin Solution 1

A solution of isooctylacrylate-acrylic acid (94:6) copolymer (67 parts) and Foral 85 resin (33 parts available form Hercules, Inc. of Wilmington, Del.) was prepared according to the procedure in Example 5 of U.S. Pat. No. 4,418,120 then diluted to 42 to 48% solids in a blend of heptane, toluene and acetone (40:35:25).

Resin Solution 2

2-Methylbutylacrylate-acrylic acid (90:10) copolymer and ethyl acetate were combined at a solids content of 35 to 40%.

Adhesive Solutions 1-5

100 parts of Resin Solution 1 and a 5% solution of 1,1'-(1,3-phenylenedicarbonyl)-bis-(2-methylaziridine) (CAS number 7652-64-4 and herein referred to as "bisamide") in toluene, were combined in the proportions shown in Table 1.

TABLE 1

| Compositions for Adhesive Solutions 1-5 | |
|---|---|
| Adhesive solution prepared | Parts of bisamide 5% solution |
| 1 | 0 |
| 2 | 1.1 |
| 3 | 2.2 |
| 4 | 3.3 |
| 5 | 5.5 |

Adhesive Solutions 6-8

100 parts of Resin Solution 2 and a 5% solution of "bisamide" in toluene, were combined in the proportions shown in Table 2.

TABLE 2

| Compositions for Adhesive Solutions 6-8 | |
|---|---|
| Adhesive solution Prepared. | Parts of "bisamide 5% solution. |
| 6 | 0 |
| 7 | 0.6 |
| 8 | 1.8 |

Adhesive Solution 9

Isooctylacrylate-acrylic acid (93:7) copolymer (83 parts), NEWPORT S resin (17 parts and available from Arizona Chemical Company), ethyl acetate and "bisamide" (0.04 parts) were combined at a solids content of 23 to 27%.

Adhesive Solution 10

Toluene, KRATON 1107 resin (50 parts and available from Shell Chemical Company, Westbrook, Ill.), and WINGTAC 95 Plus resin (50 parts and available from Goodyear Tire and Rubber Company, Akron, Ohio) were combined at a solids content of 40%.

Adhesive Solution 11

Toluene, KRATON 1107 resin (66.7 parts and available from Shell Chemical Company, Westbrook, Ill.), WINGTAC 95 Plus resin (33.3 parts and available from Goodyear Tire and Rubber Company, Akron, Ohio) and toluene were combined at a solids content of 40%.

Adhesive Solution 12

A blend of microsphere and latex adhesives were prepared according to the recipe described in Examples 1 and 4 of the international patent application WO 92/13924.

Adhesive Solution 13

A blend of microsphere and latex adhesives were prepared according to "Application of Ionomeric Resin Films as Wall Decoration" in column 12 lines 48–55 described in U.S. Pat. No. 5,196,246 and such description is incorporated herein by reference.

Vinyl Backings

The vinyl backing used to prepare the examples was a 60 μm thick plasticized, white vinyl film identical to that used in 3M number 180-10 films with Controltac brand adhesive.

Embossed Release Liners and Particle Filled, Embossed Release Liners

Embossed release liners and particle filled, embossed release liners prepared according to the specifications described in Example 3 of U.S. Pat. No. 5,296,277 were used in the preparation of Examples 1–15 and Comparative Examples C1–C16. The recesses in the liner were filled with Potter's 5000 SPHERIGLASS beads were indicated. The pattern frequency and dimensions are given in Table 3.

TABLE 3

Dimensional Specifications for Embossed and Particle Filled, Embossed Release Liners

| Release liner number | Pattern frequency (recesses per cm²) | Mean average recess depth (μm) | Mean average recess diameter (μm) | Particles in liner recesses. |
|---|---|---|---|---|
| 1 | 1120 | 20 | 85 | Spheriglass 5000 |
| 2 | 400 | 60 | 250 | Spheriglass 5000 |
| 3 | 400 | 60 | 250 | None |
| 4 | 400 | 60 | 125 | Spheriglass 5000 |

Determination of the Minimum Force Needed to form a Fully Applied Adhesive Bond after Removal of an Adhesive from an Embossed Release Liner.

This test was used to determine the "minimum force needed to form a fully applied adhesive bond after removal from an embossed release liner" and whether a sample adhesive is positionable or repositionable. The test also provides a comparative measure of the minimum amount of force needed to convert from a positionable to a fully applied adhesive bond or repositionable contact adhesive bond to a fully applied adhesive bond.

SCOTCH-MOUNT brand, number Y-4484 double coated polyethylene foam tape (layers 4, 5, 6 and 7) was laminated to Melinex film side of the sample adhesive film (layers 1, 2 and 3). The sheet was cut into 2.5×5 cm pieces. The release liner (layer 7) was removed from the SCOTCH-MOUNT tape and a second, 2.5×10 cm sheet of Melinex film (layer 8), was then laminated to the SCOTCH-MOUNT tape (layer 6) to finish the test specimen.

The embossed release liner (layer 2) was removed from the adhesive surface (layer 1) of the specimen. The specimen was gently laid with the adhesive against a standard AL-39 aluminum panel (available from Q-Panel Company, Cleveland, Ohio) at 22° C. for 30 to 60 seconds. The ease of sliding, removing and repositioning the specimen on the aluminum plate was determined at 22° C. as described in "Testing and Rating Ease of Sliding and Repositioning", column 12 lines 2 through 9 of U.S. Pat. No. 5,296,277. A rating of "4" indicates that the adhesive was not positionable or repositionable and a value of "0 g" was recorded as the "minimum force needed to form a fully applied adhesive bond after removal from an embossed release liner".

A rating less than "4", indicated that the adhesive was positionable or repositionable and the amount of force needed to fully bond the adhesive to the aluminum plate was determined as follows.

The release liner (layer 2) was removed from the adhesive surface (layer 1) of the specimen. The specimen was gently laid with the adhesive against a standard AL-39 aluminum panel at 22° C. A flat, test plate of known weight was carefully placed on top of the specimen adhesive sheet for 30 to 60 seconds, then carefully removed. The ease of sliding, removing and repositioning the specimen on the aluminum plate was again determined at 22° C. and recorded. This procedure was repeated using a fresh specimen and plates, each of sequentially greater weight, until the rating for the sample was equal to "4". The weight of the heaviest plate that could be placed on the sample without obtaining a "4" rating was recorded as the "minimum force needed to form a fully applied adhesive bond after removal from an embossed release liner".

The six different test weights were used for the above procedure. Each test plate was 2.5×5.1 cm. The plates weighed: 57, 114, 227, 341, 682 and 1362 grams, respectively.

Determination of the Minimum Force Needed to form a Fully Applied Adhesive Bond after Removal of an Adhesive from a Relaminated Release Liner This test was used to determine the "minimum force needed to form a fully applied adhesive bond after removal from a relaminated release liner" and whether the sample adhesive regains its positionable or repositionable behavior after it has been fully applied to a surface, such as a substantially smooth release liner. The method also provides a comparative measure of the minimum amount of force needed to fully reapply the adhesive to a surface.

A test specimen of the adhesive is prepared as described in the "Determination of the Minimum Force Needed to form a Fully Applied Adhesive Bond after Removal of an Adhesive from an Embossed Release Liner" Test above. The release liner (layer 2) was removed from the adhesive surface (layer 1) of the specimen. The transparent, release liner (layer 9) from SCOTCHCAL brand, number 7755 film was removed and laminated to the adhesive surface (layer 1) of the specimen using enough lamination pressure to give at least 90% adhesive wetout on the release liner as determined by visual inspection. The specimen was aged at 22° C., 50% relative humidity for at least 24 hours before testing. For all samples, there were no visible signs of separation between the adhesive and the release liner prior to testing.

The transparent release liner (layer 9) was removed from the adhesive surface (layer 1) of the specimen. The specimen was quickly, (within approximately 3 to 5 seconds) but gently laid with the adhesive against a standard AL-39 aluminum panel at 22° C. The amount of weight that the specimen could carry before a rating of "4" was obtained was determined using the procedure described in the "Determination of the Minimum Force Needed to form a Fully Applied Adhesive Bond after Removal of an Adhesive from an Embossed Release Liner" Test above and recorded as the "minimum force needed to form a fully applied adhesive bond after removal from a relaminated release liner".

Feature Rebound Test

This test provides a comparative estimate of the rate and the extent to which an adhesive surface feature, e.g. a post or a peg, that had been compressed into an adhesive, is rebounded or returned by the adhesive to its original position. The test is divided into four parts providing information on the original height of the protruding post when the embossed liner is removed, the amount of deformation of the adhesive around the post when the post is compressed into the adhesive, the rate and extent to which the adhesive surface returns to its original shape, and the rate and extent to which the post is returned to its original height above the adhesive. A sample of the adhesive film as cast on the embossed or particle filled, embossed release liner (layers 1, 2 and 3) was used for each of the following test procedures.

A. This first portion of this test was used to measure the height of the posts protruding above the adhesive before the posts were compressed into the adhesive by application of a second, transparent, release liner. SCOTCH-MOUNT brand, number Y-4484 double coated polyethylene foam tape (layers 4, 5, 6 and 7) was laminated to the Melinex film side of the sample adhesive film (layers 1, 2 and 3). The sheet was cut into 2.5×5 cm pieces. The release liner (layer 7) was removed from the SCOTCH-MOUNT tape and a glass microscope slide was then laminated to the SCOTCH-MOUNT tape (layer 6) to finish the test specimen. The embossed release liner (layer 2) was removed from the adhesive to reveal a pattern of projecting posts. The height of the posts was measured using an optical microscope. One simply focuses on the planar or background region of the adhesive, records the reading on the focus adjustment knob, then focuses on the top of the post and again records the reading on the focus adjustment knob; the difference in the two readings gives a reasonable measure (within a few μm) of the height of the post. (This technique is described in the Handbook of Chemical Microscopy, second edition, volume 1, by Chamot and Mason.) Several measurements were made for each post and several posts were so measured for each specimen. The mean average value of these measurements for each example is reported in Table 9 as "Mean Height of the Post".

B. This second portion of the test was used to measure the amount of adhesive deformation that occured when the post was compressed into the adhesive by application of a second, transparent release liner. The embossed release liner (layer 2) was removed from a sample of the adhesive film (layers 1 and 3) and discarded. The transparent, release liner was removed from a roll of Scotchcal brand, number 7755 film, and roll laminated to the microstructured adhesive surface (layer 1). The relaminated sample was aged for at least 24 hours at 22° C., 50% relative humidity and showed no evidence of separation between the adhesive and liner layers, or "liner pop off". The length of sample aging before testing is given in Table 9 as "Pretest aging". SCOTCH-MOUNT brand, number Y-4484 double coated polyethylene foam tape (layers 4, 5, 6 and 7) was laminated to the film side (layer 3) of the sample adhesive film (layers 1, 3 and 9). The sheet was cut into 2.5×5 cm pieces. The release liner (layer 7) was removed from the SCOTCH-MOUNT tape and a glass microscope slide was then laminated to the SCOTCH-MOUNT tape (layer 6) to finish the test specimen. Observation with an optical microscope of the adhesive wet out pattern on the transparent release liner revealed a compressed ring of non wetted adhesive surrounding each adhesive post, the outer diameter of the non wetted area was less than twice the diameter of the wetted top of the microstructured post. The depth of several compressed rings were measured with an optical microscope, that is, the difference in readings between the focusing on the top of the post or planer adhesive and the lowest surface of the compressed ring. The mean average depth measured for several rings on each specimen are reported in Table 9 as "Depth of compression ring".

C. This portion of the test deals with the rate and extent to which the posts and adhesive surface return to their original shape and dimensions after the transparent liner (layer 9) is removed. The transparent release liner (layer 9) was removed from the sample prepared in portion "B" of this test, and immediately a timer was started. Measurements were made with an optical microscope of the movement of the post top and the compressed ring relative to the planer adhesive surface. The technique involved sequential focusing on the top of the post, the planer adhesive surface, the lowest surface of the compressed ring, the planer adhesive surface, the top of the post, etc. Both the elapsed time and position of focus were continually recorded. The time required for the posts to return to one half of their original height above the planer adhesive surface was determined by plotting the position of focus versus elapsed time on semilog paper and is reported as "Post Height Recovery Half-life" in Table 9. Once the movement of the post and the compressed rings (if present) had seemingly stopped, several other posts and compressed rings were measured relative to the planer adhesive surface to ascertain that a representative post and ring had been measured.

D. The fourth part of this test was to determine the extent to which the posts and compressed rings return to their original height on the adhesive surface. After completing portion "C" of this test, the specimen was simply left for a total of 24 hours with the adhesive exposed to the air. An optical microscope was then used to measure the height of several posts and depth of several compressed rings (if present) relative to the planer adhesive surface. Several measurements of each post and compressed ring were made and the mean average value for each specimen is reported respectively as "Post Height Recovery after 24 hours" and "Compression ring depth recovery after 24 hours" in Table 9.

Lap Shear Stress Relaxation Test

This test was used to compare the amount and relative rate of elastic recovery of an adhesive. Coated adhesive thickness, as well as the presence or absence of microstructural surface features or particles does not significantly effect the results of this test.

A 2.5×10 cm test specimen was cut from the sample adhesive tape (layers 1 and 3). A 2.5×7.5 cm piece of Melinex film (layer 10) was attached to the adhesive to form a handling tab. The specimen was mounted to a clean, AL-39 test panel with sufficient force to give at least 90% adhesive wetout of the 2.5×2.5 cm contact patch. The mounted specimen was aged at 22° C., 50% relative humidity for at least 24 hours. The AL-39 panel and the Melinex film tabs were respectively mounted in the lower and upper jaws of an INSTRON brand Model 1122 tensile tester ( available from INSTRON Corporation, Caston, Mass.) so that there was a slight slack in the tab. The shear stress and elapsed time were recorded as the jaws of the tester were extended at a rate of 212 μm per second until the shear stress reached 65.5 kPa. At this shear stress the jaw extension was stopped and the decay in the shear stress was recorded. The value of the shear stress 120 seconds after the jaw separation stopped at 65.5 kPa was also recorded. The value of the shear stress 120 seconds after the jaw separation stopped was used in the following formula to calculate the per cent retained lap shear relaxation stress.

$$\%LSS = 100\% \times [(stress_{t=120})/(stress_{t=0})].$$

where $Stress_{t=0}$=the shear stress 120 seconds after the jaw separation stopped at 65.5 kPa, $Stress_{t=120}$=65.5 kPa, and %LSS=the per cent retained lap shear relaxation stress.

The per cent retained lap shear relaxation stress measurement was repeated three times for each sample adhesive using a new specimen each time. The arithmetic mean average for the per cent retained lap shear relaxation stress for each sample adhesive was reported as "%LSS".

The length of time needed to increase the shear stress on each sample from 0 to 65.5 kPa is also reported as "time to load".

COMPARATIVE EXAMPLES C1–C7

Comparative examples C1–C7 show that the commercially available, positionable adhesive films that have either a microstructured adhesive surface or a discontinuous coating of partially protruding solid particles on the adhesive, lose their positionable application behavior when their protective liners are removed and a different release liner is bonded to the adhesive surface in a manner consistent with compressing the protruding adhesive surface features into the adhesive.

COMPARATIVE EXAMPLE C1

The release liner from several sheets of Controltac brand Plus film, number 180-10, were removed and the ease of sliding, removing and repositioning the sheets on a glass plate was determined at 22° C. and 40° C. as described in "Testing and Rating Ease of Sliding and Repositioning", column 12 lines 2 through 9 of U.S. Pat. No. 5,296,277. A rating of 1 or 2 was obtained for each sheet.

The release liner from several sheets of the 180-10 film were removed and these release liners taken from a roll of Scotchcal brand, number 7755 film, was squeeze roll laminated at 10 feet per minute, 22° C., and 40 psi to the adhesive side of the sheets of 180-10 film. The sheets were aged at 22° C., 50% relative humidity for at least 24 hours. No signs of adhesive separation from the release liner were evident by visual inspection. The transparent release liner was removed and the ease of sliding, removing and repositioning the specimen on a glass plate was again determined at 22° C. and 40° C. A rating of 4 was obtained for each sheet since each immediately stuck when the adhesive was gently laid on the plate. The sheets could not be lifted from the glass plate without damage.

COMPARATIVE EXAMPLE C2

The release liners from several sheets of Controltac brand Plus film, number 160-30, were removed and the ease of sliding, removing and repositioning the sheets on a glass plate was determined at 22° C. and 40° C. A rating of 1 or 2 was obtained for each sheet.

The release liners from several sheets of the 160-30 film were removed and the release liner taken from a roll of Scotchcal brand, number 7755 film, was squeeze roll laminated at 10 feet per minute, 22° C., and 40 psi to the adhesive side of the sheets of 160-30 film. The sheets were aged at 22° C., 50% relative humidity for at least 24 hours. No signs of adhesive separation from the release liner were evident by visual inspection. The transparent release liner was removed and the ease of sliding, removing and repositioning the specimens on a glass plate was again determined at 22° C. and 40° C. A rating of 4 was obtained for each sheet since each immediately stuck when the adhesive was gently laid on the plate. The sheets could not be lifted from the glass plate without damage.

COMPARATIVE EXAMPLE C3

The release liners from several sheets of Controltac brand film, number 180-10, were removed and the ease of sliding, removing and repositioning the sheets on a glass plate was determined at 22° C. and 40° C. A rating of 1 or 2 was obtained for each sheet.

The release liners from several sheets of the 180-10 film were removed and the release liners taken from a roll of Scotchcal brand, number 7755 film, was squeeze roll laminated at 10 feet per minute, 22° C., and 40 psi to the adhesive side of the sheets of film. The sheets were aged at 22° C., 50% relative humidity for at least 24 hours. No signs of adhesive separation from the release liners were evident by visual inspection. The transparent release liner was removed and the ease of sliding, removing and repositioning the specimens on a glass plate was again determined at 22° C. and 40° C. A rating of 4 was obtained for each sheet since each immediately stuck when the adhesive was gently laid on the plate. The sheets could not be lifted from the glass plate without damage.

The transparent release liner was removed from another sample. The surface of the adhesive was inspected microscopically within 5 minutes of removing the liner using an environmental scanning electron microscope (located at the University of Minnesota, Institute of Technology, Minneapolis, Minn.). The electron micrographs showed that the few large (greater than 60 μm diameter) hollow glass spheres were broken and pressed completely into the adhesive and the vast majority of smaller hollow glass spheres (less than 60 μm diameter) were not broken and also were completely pressed into the adhesive surface.

COMPARATIVE EXAMPLE C4

The release liners from several sheets of Scotchcal brand Plus film, number 3650-10, were removed and the ease of sliding, removing and repositioning the sheets on a glass plate was determined at 22° C. and 40° C. A rating of 1 or 2 was obtained for each sheet.

The release liners from several sheets of the 3650-10 film were removed and the release liners taken from a roll of Scotchcal brand, number 7755 film, was squeeze roll laminated at 10 feet per minute, 22° C., and 40 psi to the adhesive side of the sheets of 3650-10 film. The sheets were aged at 22° C., 50% relative humidity for at least 24 hours. No signs of adhesive separation from the release liners were evident by visual inspection. The transparent release liner was removed and the ease of sliding, removing and repositioning the specimens on a glass plate was again determined at 22° C. and 40° C. A rating of 4 was obtained for each sheet since each immediately stuck when the adhesive was gently laid on the plate. The sheets could not be lifted from the glass plate without damage.

COMPARATIVE EXAMPLE C5

The release liners from several sheets of Scotchcal brand Plus film, number 3470, were removed and the ease of sliding, removing and repositioning the sheets on a glass plate was determined at 22° C. and 40° C. A rating of 1 or 2 was obtained for each sheet.

The release liners from several sheets of the 3470 film were removed and the release liners taken from a roll of Scotchcal brand, number 7755 film, was squeeze roll laminated at 10 feet per minute, 22° C., and 40 psi to the adhesive side of the sheets of 3470 film. The sheets were aged at 22° C., 50% relative humidity for at least 24 hours. No signs of adhesive separation from the release liners were evident by visual inspection. The transparent release liner was removed and the ease of sliding, removing and repositioning the specimens on a glass plate was again determined at 22° C. and 40° C. A rating of 4 was obtained for each sheet since each immediately stuck when the adhesive was gently laid on the plate. The sheets could not be lifted from the glass plate without damage.

COMPARATIVE EXAMPLE C6

The release liners from several sheets of Controltac brand Plus film, number 181-10, were removed and the ease of sliding, removing and repositioning the sheets on a glass plate was determined at 22° C. and 40° C. as described in "Testing and Rating Ease of Sliding and Repositioning", column 12 lines 2 through 9 of U.S. Pat. No. 5,296,277. A rating of 1 or 2 was obtained for each sheet.

The release liners from several sheets of the 181-10 film were removed and the release liners taken from a roll of Scotchcal brand, number 7755 film, was squeeze roll laminated at 10 feet per minute, 22° C., and 40 psi to the adhesive side of the sheets of 181-10 film. The sheets were aged at 22° C., 50% relative humidity for at least 24 hours. No signs of adhesive separation from the release liner were evident by visual inspection. The transparent release liner was removed and the ease of sliding, removing and repositioning the specimens on a glass plate was again determined at 22° C. and 40° C. A rating of 4 was obtained for each sheet since each immediately stuck when the adhesive was gently laid on the plate. The sheets could not be lifted from the glass plate without damage.

COMPARATIVE EXAMPLE C7

The release liners from several sheets of EG Tac brand film (LinTec, Japan) were removed and the ease of sliding, removing and repositioning the sheets on a glass plate was determined at 22° C. and 40° C. A rating of 1 or 2 was obtained for each sheet.

The release liners from several sheets of the EG Tac brand film were removed and the release liners taken from a roll of Scotchcal brand, number 7755 film, was squeeze roll laminated at 10 feet per minute, 22° C., and 40 psi to the adhesive side of the sheets of EG Tac brand film. The sheets were aged at 22° C., 50% relative humidity for at least 24 hours. No signs of adhesive separation from the release liners were evident by visual inspection. The transparent release liner was removed and the ease of sliding, removing and repositioning the specimens on a glass plate was again determined at 22° C. and 40° C. A rating of 4 was obtained for each sheet since each immediately stuck when the adhesive was gently laid on the plate. The sheets could not be lifted from the glass plate without damage.

The transparent release liner was removed from another sample. The surface of the adhesive was inspected microscopically within 5 minutes of removing the liner. The inspection showed discrete solid glass beads scattered randomly over the surface and fully compressed into the adhesive.

EXAMPLE 1

Room Decorator Kit adhesive film (3M Company, Inc., St. Paul Minn.), was made positionable in the following manner. The release liner was removed from a roll of Room Decorator Kit film and discarded. The adhesive side of the Room Decorator Kit film was laminated using a squeeze roll laminator heated to 70° C., to the glass bead filled, embossed release liner number 1. Removal of the embossed release liner and visual inspection of the adhesive surface under a microscope clearly shows that about 30 to 40% of the glass bead clusters had transferred from the liner to the adhesive surface forming a semi regular pattern of protruding glass bead clusters.

This modified Room Decorator Kit film was then laid adhesive side against a glass plate were it was easily slid over the glass surface into proper location without sticking to the glass. Pressing the adhesive film against the glass pane according to the instructions provided in the Room Decorator Kit, provided instant bonding and substantially complete wet out of the adhesive on the glass plate.

The attached sheet of the modified Room Decorator Kit adhesive film was removed from the glass plate, immediately re-laid on the glass plate were it was easily slid over the surface and easily reattached by pressing the film against the plate. The process of removing the modified Room Decorator Kit adhesive film from the glass plate, immediately relaying on the plate, freely sliding the film over the surface and reattaching it with pressure was repeated each day for a week with substantially the same behavior.

Sheets of the modified Room Decorator Kit adhesive film behaved in similar fashion when attached to, then removed from painted metal doors, a fiberglass shower, painted gloss and semi gloss walls, glass windows, painted furniture, a FORMICA table and counter top, and a 304 stainless steel panel. Sheets of the modified Room Decorator Kit adhesive film were bonded to a painted lab door and a fiberglass shower for 10 months. After 10 months the modified Room Decorator Kit adhesive film was removed, immediately re-laid against the door and shower where it was easily slid over the surface without preadhesion and easily reattached by pressing in place.

EXAMPLES 2-5 AND COMPARATIVE EXAMPLES C8-C9

Examples 2-5 and Comparative Examples C8-C9 show the time dependent behavior of the adhesive films of this invention. Adhesive surfaces having either a pattern of protruding, discrete clusters of glass beads or a pattern of glass bead filled adhesive "pegs" were prepared according to the methods of U.S. Pat. No. 5,141,790 and U.S. Pat. No. 5,296,277. Examples 2-5 and comparative examples C8 and C9 may be laid against a surface and easily slid over the surface at this point. The protruding features are next pressed into the adhesive surface by laminating the adhesive film to a substantially smooth release liner. When the smooth release liner is removed. Comparative Examples C8 and C9, which exemplify the prior art, instantly stick to a surface that they are laid against. They did not recover their original positionable behavior within a useful period of time. Examples 2-5 exemplify the invention wherein a positionable or repositionable behavior is provided to an adhesive by means of placing an appropriate protruding feature on the surface of the adhesive, compressing the feature into the adhesive by bonding the adhesive to a release liner or other substrate surface for an indefinite period of time and then having the desired positionable or repositionable behavior reappear in a functionally useful period of time, usually a few seconds to a few minutes, by removing the adhesive article from the liner or substrate.

EXAMPLE 2 AND COMPARATIVE EXAMPLES C8-C9

The Scotchcal brand marking films shown in table 4 were made positionable in the following manner.

The release liner was removed from a roll of the indicated Scotchcal brand marking film and discarded. The adhesive side of the film was laminated to the glass bead filled, embossed release liner number 1 at 10 feet per minute using a PROTEC ORCA squeeze roll laminator heated to 60° C. Removal of the embossed release liner and visual inspection of the adhesive surface under a microscope showed that substantially all of the glass bead clusters had transferred to the adhesive surface forming a regular pattern of protruding glass bead clusters.

The embossed release liner was removed from the adhesive film and discarded. The paper release liner from 3M number 220 Scotchcal brand film was removed and squeeze roll laminated at 10 feet per minute using a PROTEC ORCA laminator heated to 60° C., to the microstructured adhesive surface. The relaminated sample was aged for at least 24 hours at 22° C., 50% relative humidity and showed no evidence of separation between the adhesive and liner layers, or "liner pop off".

EXAMPLES 3–5

The Aroset brand adhesive solutions (available from Ashland Chemical, Inc., Columbus, Ohio) shown in Table 4, were coated to a wet thickness of about 150 μm onto the glass bead filled, embossed release liner number 1. The adhesive was oven dried for 1 minute at 65° C., then for 2 minutes at 93° C. A 60 μm thick vinyl film was laminated at 22° C. to the adhesive layer on the liner to give a pressure sensitive adhesive film on a release liner. Removal of the embossed release liner and visual inspection of the adhesive surface under a microscope showed an adhesive surface that substantially replicated the surface of the release liner.

The embossed release liner was removed from the adhesive film and discarded. The paper release liner from 220 Scotchcal brand film (3M Company, St. Paul, Minn.) was removed and squeeze roll laminated at 10 feet per minute using a PROTEC ORCA laminator heated to 60° C., to the microstructured adhesive surface. The relaminated sample was aged for 72 hours at 22° C. 50% relative humidity and showed no evidence of separation between the adhesive and liner layers, or "liner pop off".

Premask tape number SCPM-3 (3M Company, St. Paul, Minn.) was laminated to the vinyl film side of the sample and test strips, 5×15 cm, were cut from the films. The paper release liner was removed and the adhesive side of the premask film was laid, after the stated waiting period, onto a "Ford" painted steel test panel at 22° C., 50% relative humidity. The test film was slid or repositioned across the panel surface as described in the test "Testing and Rating Ease of Sliding and Reositioning" and rated according to the published scale. The ratings for each sample are shown in Table 4.

TABLE 4

| Example | Adhesive or Adhesive film used | Time between release liner removal and placement on the Ford Panel* | Slide Rating at 22° C., 50% relative humidity |
|---|---|---|---|
| 2 | Scotchcal brand STR 9000 film | <15 seconds | 1 |
| 3 | Aroset 2551-W52 adhesive | <15 seconds | 3 |
| 3 | Aroset 2551-W52 adhesive | 5 minutes | 1 to 2 |
| 4 | Aroset 1452-Z40 (32 parts) and Aroset 1450-Z40 (68 parts) adhesive | <15 seconds | 1 to 2 |
| 5 | Aroset 1452-Z40 (68 parts) and Aroset 1450-Z40 (32 parts) adhesive | <15 seconds | 1 to 2 |
| C8 | Scotchcal brand 3650 film | <15 seconds | 4 |
| C8 | Scotchcal brand 3650 film | 5 minutes | 4 |
| C8 | Scotchcal brand 3650 film | 15 minutes | 3 to 4 |
| C8 | Scotchcal brand 3650 film | 30 minutes | 2 to 3 |
| C8 | Scotchcal brand 3650 film | 70 minutes | 1 to 2 |
| C9 | Scotchcal brand 3680 film | <15 seconds | 4 |
| C9 | Scotchcal brand 3680 film | 60 minutes | 4 |
| C9 | Scotchcal brand 3680 film | 24 hours | 4 |

EXAMPLES 6–10 COMPARATIVE EXAMPLES C10–C12.

100 Parts of the adhesive solution designated in Table 5A was diluted with 35 parts of heptane and 35 parts of acetone.

The diluted solution was coated to a wet thickness of about 100 μm onto the embossed or particle filled, embossed release liner designated in Table 5A, then air dried for 15 minutes at 22° C. The ted adhesive solution was coated to a wet thickness of about 225 μm on top air dried adhesive coating, then dried for 15 minutes at 22° C., 15 minutes at 40° C., 15 minutes at 70° C. and 15 minutes at 90° C. to afford a 100–150 μm thick film of adhesive (layer 1) on embossed release liner (layer 2). Melinex film (layer 3) was roll laminated at 22° C. to the air side of the adhesive. Samples of this material were used for "Feature Rebound Testing".

The embossed release liner (layer 2) was removed from the sample and the ease of sliding, removing and repositioning the sheet was immediately determined at 22° C. The result is reported in Table 5B as "Rated Ease of Sliding and Repositioning after Removal from an Embossed Release Liner".

The "minimum force needed to form a filly applied adhesive bond after removal from an embossed release liner", the "minimum force needed to form a filly applied adhesive bond after removal from a relaminated release liner" and the "per cent retained lap shear relaxation stress" were also determined immediately after the liner was removed from the sample. The results are reported in Tables 5A and 5B.

The embossed release liner (layer 2) was removed from another sample of the adhesive film and discarded. The release liner was removed from a roll of Scotchcal brand, number 7755 film, and roll laminated to the microstructured adhesive surface. The relaminated sample was aged for at least 24 hours at 22° C., 50% relative humidity and showed no evidence of separation between the adhesive and liner layers, or "liner pop off". The relaminated release liner was removed and the ease of sliding, removing and repositioning the sheet was immediately determined at 22° C. The result is reported in Table 5B as the "Rated ease of sliding and repositioning after removal from a relaminated release liner".

TABLE 5A

| Example number. | Adhesive solution coated. | Liner used. | % LSS* | Time to load. ** |
|---|---|---|---|---|
| C10 | 1 | 2 | 18.7 | 83 |
| C11 | 2 | 2 | 49 | 37.6 |
| C12 | 2 | 4 | — | — |
| 6 | 3 | 2 | 68.6 | 29 |
| 7 | 4 | 4 | 78.5 | 26.2 |
| 8 | 5 | 2 | 84.4 | 20.5 |
| 9 | 5 | 4 | 87.3 | 19.1 |
| 10 | 5 | 3 | 87.4 | 20.5 |

TABLE 5B

| Example number. | Rated ease of sliding and repositioning after removal from an embossed release liner.*** | Rated ease of sliding and repositioning after removal from a relaminated release liner.*** | Minimum force needed to form a fully applied adhesive bond after removal from an embossed release liner.**** | Minimum force needed to form a fully applied adhesive bond after removal from a relaminated release liner.***** |
|---|---|---|---|---|
| C10 | 1–2 | 4 | 114 | 0 |
| C11 | 1–2 | 4 | 227 | 0 |
| C12 | 1–2 | 4 | 114 | 0 |

TABLE 5B-continued

| Example number. | Rated ease of sliding and repositioning after removal from an embossed release liner.*** | Rated ease of sliding and repositioning after removal from a relaminated release liner.*** | Minimum force needed to form a fully applied adhesive bond after removal from an embossed release liner."**** | Minimum force needed to form a fully applied adhesive bond after removal from a relaminated release liner."***** |
|---|---|---|---|---|
| 6 | 1–2 | 2–3 | 681 | 114 |
| 7 | 1–2 | 1–2 | 1362 | 227 |
| 8 | 1–2 | 1–2 | 1362 | 681 |
| 9 | 1–2 | 1–2 | 681 | 341 |
| 10 | 2–3 | 2–3 | 227 | 114 |

*The percent retained lap shear relaxation stress measured by the "Lap Shear Stress Relaxation" Test
**The length of time, in seconds, needed to increase the shear stress on each sample from 0 to 65.5 kPa at a jaw separation speed of 212 μm/sec.
***"Testing and Rating Ease of Sliding and Repositioning", Column 12 lines 2 through 9 of U.S. Pat. No. 5,296,277
****Measured by the "Determination of the Minimum Force Needed to form a Fully Applied Adhesive Bond after Removal of an Adhesive from an Embossed Release Liner." test.
*****Measured by the "Determination of the Minimum Force Needed to form a Fully Applied Adhesive Bond after Removal of an Adhesive from a Relaminated Release Liner." test

EXAMPLES 11–13 AND COMPARATIVE EXAMPLES C13–C15.

100 Parts of the adhesive solution designated in Table 6 was diluted with 30 parts of heptane and 30 parts of acetone. The diluted solution was coated to a wet thickness of about 100 μm onto particle filled, embossed release liner number 1, then dried for 15 minutes at 22° C., 15 minutes at 65° C. and 15 minutes at 93° C. to afford a 20–40 μm thick film of adhesive (layer 1) on embossed release liner (layer 2). Melinex film (layer 3) was roll laminated at 22° C. to the air side of the adhesive.

The embossed release liner (layer 2) was removed from the sample and the ease of sliding, removing and repositioning the sheet was immediately determined at 22° C. The result is reported in Table 6 as "Rated ease of sliding and repositioning after removal from an embossed release liner".

The embossed release liner (layer 2) was removed from another sample of the adhesive film and discarded. The relaminated release liner was removed from a roll of Scotchcal brand, number 7755 film, and roll laminated to the microstructured adhesive surface. The relaminated sample was aged for at least 24 hours at 22° C., 50% relative humidity and showed no evidence of separation between the adhesive and liner layers, or "liner pop off". The release liner was removed and the ease of sliding, removing and repositioning the sheet was immediately determined at 22° C. The result is reported in Table 6 as the "Rated ease of sliding and repositioning after removal from a relaminated release liner".

TABLE 6

| Example number. | Adhesive solution coated. | Rated ease of sliding and repositioning after removal from an embossed release liner.* | Rated ease of sliding and repositioning after removal from a relaminated release liner.* |
|---|---|---|---|
| C13 | 2 | 2–3 | 4 |
| C14 | 6 | 1–2 | 4 |
| C15 | 7 | 1–2 | 4 |
| 11 | 4 | 1–2 | 2–3 |
| 12 | 5 | 1–2 | 1–2 |
| 13 | 8 | 1–2 | 2–3 |

*"Testing and Rating Ease of Sliding and Repositioning", Column 12 lines 2 through 9 of U.S. Pat. No. 5,296,277

EXAMPLES 14 AND 15, COMPARATIVE EXAMPLE C16.

The adhesive solution indicated in Table 7, was coated to a wet thickness of about 75 μm onto particle filled, embossed release liner number 1, then dried for 15 minutes at 22° C., 15 minutes at 40° C., 15 minutes at 70° C. and 15 minutes at 90° C. to afford a 20–40 μm thick film of adhesive (layer 1) on embossed release liner (layer 2). Melinex film (layer 3) was roll laminated at 22° C. to the air side of the adhesive.

The embossed release liner (layer 2) was removed from the sample and the ease of sliding, removing and repositioning the sheet was immediately determined at 22° C. The result is reported in Table 7 as "Rated ease of sliding and repositioning after removal from an embossed release liner".

The embossed release liner (layer 2) was removed from another sample of the adhesive film and discarded. The relaminated release liner was removed from a roll of Scotchcal brand, number 7755 film, and roll laminated to the microstructured adhesive surface. The relaminated sample was aged for at least 24 hours at 22° C., 50% relative humidity and showed no evidence of separation between the adhesive and liner layers, or "liner pop off". The release liner was removed and the ease of sliding, removing and repositioning the sheet was immediately determined at 22° C. The result is reported in Table 7 as the "Rated ease of sliding and repositioning after removal from a relaminated release liner".

TABLE 7

| Example number. | Adhesive solution coated. | Rated ease of sliding and repositioning after removal from embossed release liner.* | Rated ease of sliding and repositioning after removal from relaminated release liner.* |
|---|---|---|---|
| C16 | 9 | 1–2 | 4 |
| 14 | 10 | 1–2 | 1–2 |
| 15 | 11 | 1–2 | 1–2 |

*"Testing and Rating Ease of Sliding and Repositioning", Column 12 lines 2 through 9 of U.S. Pat. No. 5,296,277

Preparation of Adhesive Samples 1–8 for the "Lap Shear Stress Relaxation" Testing.

The adhesive solutions used to prepare examples 3, 8–10, 12–15 and comparative examples C1, C3, C8, C9, C14–C16 were also used to prepare adhesive test samples 1–8, which were used in for measuring the "per cent retained lap shear relaxation stress" by "Lap Shear Stress Relaxation" test. Table 8 shows which adhesive test sample corresponds to each example and comparative example.

The adhesive solution indicated in Table 8, was coated onto PolySlik brand release liner, number DP 6557 (available from Rexam Release, Bedford Park, Ill.), then dried for 15 minutes at 22° C., 15 minutes at 40° C., 15 minutes at 70° C. and 15 minutes at 90° C. to afford a 100 to 150 μm thick adhesive sample (layer 1) on a release liner (layer 2). Melinex film (layer 3) was roll laminated at 22° C. to the air side of the adhesive. The release liner (layer 2) was removed and the test tape (layers 1 and 3) was used immediately for "Lap Shear Stress Relaxation" testing.

Preparation of Adhesive Samples 9–10 for the "Lap Shear Stress Relaxation" Testing.

The adhesive solutions used to prepare Examples 1 and 2 were also used to prepare adhesive test samples 9 and 10, which were used in for measuring the "per cent retained lap shear relaxation stress" (LSS%) by "Lap Shear Stress Relaxation" test. Table 8 shows which adhesive test sample corresponds to each example.

The adhesive solution indicated in Table 8, was coated onto Melinex film (layer 3), then dried for 15 minutes at 93° C. to afford a 25 to 50 μm thick adhesive film (layer 1). The sample tape was used immediately for "Lap Shear Stress Relaxation" testing.

TABLE 8

| Lap shear stress relaxation test adhesive sample number. | Adhesive solution coated. | % LSS* | Time to load.** | Examples produced using this adhesive. |
|---|---|---|---|---|
| 1 | 5 | 89.2 | 23.4 | 8, 9, 10, 12 |
| 2 | 6 | 57.9 | 14.9 | C14 |
| 3 | 7 | 59.5 | 9.7 | C8, C15 |
| 4 | 8 | 63.9 | 13.9 | 13 |
| 5 | 9 | 50.6 | 15.2 | C1, C3, C9, C16 |
| 6 | 10 | 91 | 7.8 | 14 |
| 7 | 11 | 92.2 | 13.5 | 15 |
| 8 | Aroset 2551-W52 | 79.2 | 11.9 | 3 |
| 9 | 13 | 84.5 | 15 | 1 |
| 10 | 12 | 79.2 | 11.9 | 2 |

TABLE 9A

| Example number. | Mean height of the post. (um)* | Post height recovery half-life. (min.)*** | Post height recovery after 24 hours. (um.)**** | Pretest aging (days)***** |
|---|---|---|---|---|
| 6 | 60 | 2.5 | 52 | 1 |
| 6 | 60 | 2.5 | — | 300 |
| 7 | 60 | 0.2 | 60 | 1 |
| 8 | 60 | <0.2 | 60 | 3 |
| C10 | 60 | >1500 | <5 | 1 |
| C10 | 60 | no recovery | 0 | 300 |
| C11 | 60 | 17 | 50 | 3 |
| C11 | 60 | 17 | — | 300 |

TABLE 9B

| Example number. | Depth of compression ring. (um)** | Compression ring depth recovery after 24 hours. (um)**** |
|---|---|---|
| 6 | 29 | 0 |
| 6 | 29 | — |
| 7 | 28 | 0 |
| 8 | 30 | 0 |
| C10 | 24 | 25 |
| C10 | no ring | 0 |

TABLE 9B-continued

| Example number. | Depth of compression ring. (um)** | Compression ring depth recovery after 24 hours. (um)**** |
|---|---|---|
| C11 | 28 | 8 |
| C11 | p | — |

*"Section 'A', Feature Rebound Test"
**"Section 'B', Feature Rebound Test". "No ring" indicates that adhesive has completely wetted out the release liner. "p" indicates that a compression ring is present but was not measured.
***"Section 'C', Feature Rebound Test". "No recovery" indicates that the adhesive surface no longer has any post features.
****"Section 'D', Feature Rebound Test".
*****Length of time between replacement of the embossed release liner by the transparent release liner and testing of the specimen in sections "B", "C" and "D", "Feature Rebound Test".

Various modifications and alterations of this invention will become apparent to those skilled in the art without departing from the scope and principles of this invention, and it should be understood that this invention is not be unduly limited to the illustrative embodiments set forth hereinabove. All publications and patents are incorporated herein by reference to the same extent as if each individual publication or patent was specifically and individually indicated to be incorporated by reference.

We claim:

1. An adhesive sheet comprising (1) a backing and (2) an adhesive layer wherein the adhesive layer comprises (a) at least one topologically microstructured surface comprising a plurality of pegs, substantially uniformly distributed and protruding outwardly from an adhesive layer surface, wherein the pegs have tops that are adhesive and comprise less than 25% of the total surface area of the adhesive layer, (b) the adhesive surface layer and (c) an adhesive that has a retained lap shear relaxation stress that exceeds 55% and the adhesive layer has at least two levels of adhesion, an initial contact bond and an application bond, such that the initial contact bond is substantially less than the application bond and such that the contact bond simultaneously changes to the application bond with the application of pressure onto the adhesive sheet.

2. The adhesive sheet according to claim 1, wherein the adhesive layer surface is essentially planar between the pegs.

3. The adhesive sheet according to claim 1, wherein the pegs have essentially flat tops and protrude outwardly from the adhesive layer surface to a height in the range of 4 μm to 200 μm.

4. The adhesive sheet according to claim 1, wherein the adhesive sheet is a transfer tape having at least one topologically microstructured surface according to claim 1.

5. The adhesive sheet according to claim 1 wherein the retained lap shear relaxation stress exceeds 70%.

6. The adhesive sheet according to claim 1 further comprising a smooth release liner.

7. The adhesive sheet according to claim 1 further comprising a smooth backing and a low adhesion backsize coated thereon the side opposite the adhesive layer.

8. The adhesive sheet according to claim 1 wherein the adhesive layer comprises (a) a blend of 20 to 100% by volume of microsphere adhesive, wherein the microspheres have a diameter in the range of 1 to 100 μm.

9. An adhesive sheet comprising (1) a backing and (2) an adhesive layer wherein the adhesive layer comprises (a) at least one topologically microstructured surface comprising a plurality of composite pegs, substantially uniformly distributed and protruding outwardly from an adhesive layer surface, wherein the composite pegs comprise one or more beads mixed into the adhesive such that the tops of each composite peg is adhesive and the composite pegs comprise less than 25% of the total surface area of the adhesive layer, and (b) an adhesive that has a retained lap shear relaxation stress that exceeds 55% and the adhesive layer has at least two levels of adhesion, an initial contact bond and an application bond, such that the initial contact bond is substantially less than the application bond and such that the contact bond simultaneously changes to the application bond with the application of pressure onto the adhesive sheet.

10. The adhesive sheet according to claim 9, wherein the adhesive layer surface is essentially planar between the composite pegs.

11. The adhesive sheet according to claim 9, wherein the composite pegs have essentially flat tops and protrude outwardly from the adhesive layer surface to a height in the range of 4 μm to 200 μm.

12. The adhesive sheet according to claim 9, wherein the adhesive sheet is a transfer tape having at least one topologically microstructured surface according to claim 9.

13. The adhesive sheet according to claim 1 wherein the retained lap shear relaxation stress exceeds 70%.

14. The adhesive sheet according to claim 9 further comprising a smooth release liner.

15. The adhesive sheet according to claim 9 further comprising a smooth backing and a low adhesion backsize coated thereon the side opposite the adhesive layer.

16. The adhesive sheet according to claim 9 wherein the adhesive layer comprises (a) a blend of 20 to 100% by volume of microsphere adhesive, wherein the microspheres have a diameter in the range of 1 to 100 μm.

* * * * *

UNITED STATES PATENT AND TRADEMARK OFFICE
CERTIFICATE OF CORRECTION

PATENT NO.: 5,795,636

DATED: Aug. 18, 1998

INVENTOR(S): Janet T. Keller, Kenneth D. Wilson, Clyde D. Calhoun, Larry A. Meixner It is certified that error appears in the above-identified patent and that said Letters Patent is hereby corrected as shown below:

Col. 24, Line 34, "(b) the adhesive surface layer and" should read
-- the adhesive surface between and around the pegs is greater than 30% of the total surface area of the adhesive layer and --.

Col. 24, line 67, "the composite pegs comprise one or more beads mixed into the adhesive such that the tops of each composite peg is adhesive and the composite pegs" should read
-- the pegs have tops that are adhesive and comprises one or more beads mixed into the adhesive such that the top of each composite peg is adhesive and the pegs --.

Col. 25, line 6, "an initial contact bond" should read
-- a contact bond --.

Col. 25, line 8, "and such that" should read
-- and that --

Col. 26, line 4, "according to claim 1" should read
-- according to claim 9 --.

Signed and Sealed this

Twenty-third Day of March, 1999

Attest:

Q. TODD DICKINSON

Attesting Officer

Acting Commissioner of Patents and Trademarks